UNITED STATES PATENT OFFICE.

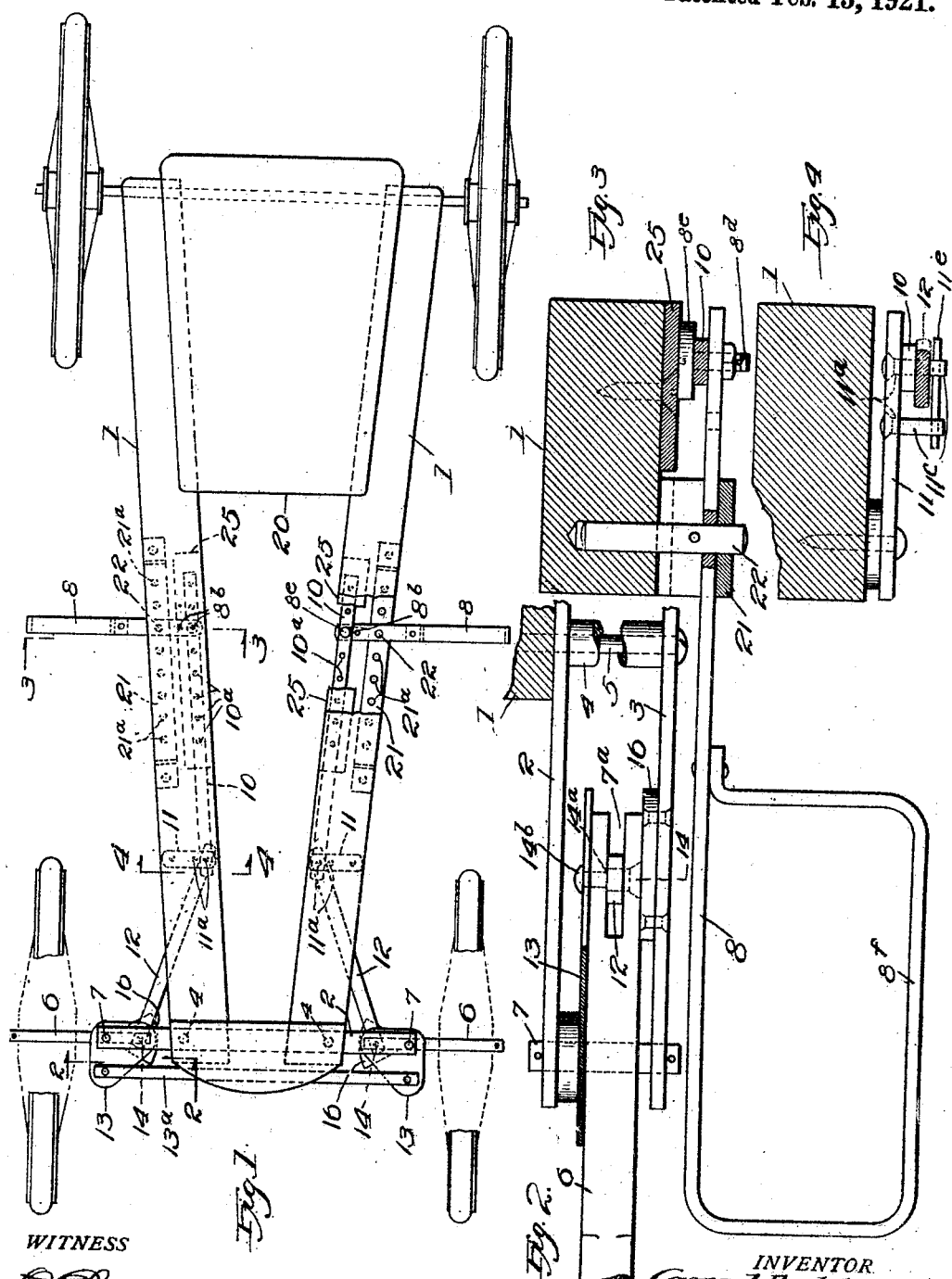

CONRAD DAHL, OF CHICAGO, ILLINOIS.

VEHICLE STEERING MECHANISM.

1,368,611.  Specification of Letters Patent.  Patented Feb. 15, 1921.

Application filed July 14, 1920. Serial No. 396,203.

*To all whom it may concern:*

Be it known that I, CONRAD DAHL, a citizen of the United States, residing at Chicago, in the county of Cook and the State of Illinois, have invented certain new and useful Improvements in Vehicle Steering Mechanism, of which the following is a specification, reference being had to the accompanying drawings, forming a part thereof.

The purpose of this invention is to provide an improved construction of steering mechanism, particularly designed for occupant-operated vehicles, and for steering by the feet of the occupant, but not limited to these specific types of vehicles. It consists in the elements and features of construction shown and described, as indicated in the claims.

In the drawings:—

Figure 1 is a plan view of a portion of the frame structure of a vehicle equipped with this invention.

Fig. 2 is a section at the line, 2—2, on Fig. 1, upon a large scale.

Fig. 3 is a section at the line, 3—3, on Fig. 1, upon the same scale as Fig. 2.

Fig. 4 is a section at the line, 4—4, on Fig. 1, upon the same scale as Fig. 2.

In the structure shown in the drawings, 1, 1, are longitudinally-extending side bars of the frame structure of a vehicle, the same being shown diverging rearwardly for purposes not concerned with this invention. The frame bars are connected rigidly by the rear axle and super-structure, and at the forward end by the upper plate, 2, of the fixed front axle, which comprises also a lower plate, 3, spaced from the upper plate a distance adequate to accommodate between the two plates the steering wheel spindles and operating connections hereinafter described. The spacing apart of the two plates, 2 and 3, is effected by means of spacing sleeves, 4, 4, on the bolts, 5, 5, by which the longitudinal bars, 1, 1, are made fast to the fixed front axle member 2. The steering wheel spindles, 6, 6, are pivoted for their steering movement to the opposite ends of the fixed axle comprising the bars, 2 and 3, the spindle being extended between said two bars at its inner end for the operating connection thereto, the pivot bolt, 7, being, for purposes hereinafter explained, made freely insertible through both the bars and the intervening spindle, and retained by a cotter pin or the like, inserted through the said pivot bolt above and below said bars, 2 and 3, respectively,—see Fig. 2. For operating the steering wheel spindles for steering, levers, 8, 8, positioned for being operated by the feet of the occupant, are fulcrumed on the longitudinal side bars, 1, 1, projecting outward from said bars respectively. From the inner end of each of the operating levers, 8, an extensor link, 10, extends to the inner end of a radius lever, 11, pivoted on the side bar, 1, and extending inward from its pivot; and from the same pivot by which the extensor link is connected to the radius lever, an operating link, 12, extends to the inner end of the steering wheel spindle at that side of the vehicle. Said inner end of the spindle is forked, as seen at 7ª, and the forward end of the operating link, 12, is entered in the crotch of the fork for its pivotal connection to the spindle. Upon the upper side of each steering wheel spindle, there is lodged and made fast thereto a lever plate, 13, which regardless of the means hereinafter specified for making it rigid with the spindle, is fixed thereto for movement therewith in the plane in which the spindle moves for steering, by being engaged both by the pivot, 7, by which the spindle is pivoted to the fixed front axle bar, and also with the pivot, 14, by which the operating link, 12, is connected with the spindle. The last mentioned pivot is constructed so as to operate as a rivet in securing the lever plate, 13, to the spindle, being made with a shoulder, 14ª, which stops against the upper or inner side of the upper fork prong of the spindle, and being headed down above the lever plate, as seen at 14ᵇ, thus making the pivot bolt, 14, and the lever plate, 13, rigid with the spindle, without in any manner binding the operating link, 12, at its pivotal connection with the spindle. Upon the upper side of the lower front axle plate, 3, under the inner end of each of the spindles there is mounted fixedly a sectoral wear plate, 16, horizontally extended transversely of the axle for seating the inner end of the spindle at all positions in its steering movement.

In order to accommodate the position of the operating foot lever, 8, to the length of limb of the occupant, who must reach the steering lever from his position upon the seat, 20, the metal bar, 21, which is secured to the lower side of the longitudinal bar, 1, to afford fulcrum support for the lever, 8, has a multiplicity of pivot bolt holes, 21ª, distributed over its length, in any one of which the pivot bolt, 22, may be placed. And to correspondingly vary the operative length of the extensor link, 10, that link is provided with a like multiplicity of similarly spaced pivot bolt holes, 10ª, at which the pivot pin which connects the operating lever with the extensor link may be engaged.

To vary the length of lever stroke necessary for the maximum turning movement of the steering wheel spindle required or for which the vehicle is adapted, a plurality of pivot bolt holes, 8ᵇ, are provided in the short arm of the lever, 8, that is, at the inner side of its fulcrum, at any one of which the pivot connecting the lever with the extensor link may be engaged. The radius lever, 11, is similarly provided with a plurality of pivot bolt holes, 11ª, at different distances from its fulcrum on the longitudinal side bar, 1, at any one of which the extensor link may be engaged with the radius lever; and the operating link, 12, may be engaged with any one of the said pivot bolt holes, 11ª, of the radius lever, regardless of the engagement of the extensor link; that is to say, the extensor link and the operating link may be engaged with the same or with different bolt holes in the radius lever, 12. Upon consideration of the construction above described in respect to the plurality of pivotal connections provided on the operating lever and the radius lever, it will be seen that the two pivot bolt holes in the inner arm of the operating lever, 8, and two pivot bolt holes in the lever arm of the radius lever, 11, four different leverages are provided; each of which is available with the operating link, 12, connected at either of the two holes on the radius lever, 11, making eight leverages in all, and that with the position for mounting the operating lever at any one of its plurality of positions along the bar, 21, on the side bar, 1, all of these eight leverages are available at any of the positions to which the operating lever may be adjusted along the frame.

25, is a wear plate on the under side of the side bar, 1, against which the head of the pivot bolt, 8ᵈ, may bear in the movement of the lever, 8. For affording this bearing at the different pivotal connections provided in the lever, 8, this wear plate is made wide enough to span both the holes, 8ᵇ, as seen in Fig. 1.

The steering pedal is desirable made as seen in Fig. 2, in the form of a loop, 8ᶠ, into which the rider will insert his foot, then obtaining engagement which is effective for steering without regard to down pressure of the foot on the pedal.

I claim:—

1. In an occupant-operated vehicle, in combination with the frame and steering wheel spindles pivoted thereto for their steering movement, a steering lever fulcrumed on the frame; an idle radius lever pivoted on the frame intermediate the steering lever and the transverse line at which the steering wheel spindles are pivoted; an extensor link connecting the steering lever and the radius lever, and an operating link extending from the radius lever to the wheel spindle.

2. In the construction defined in claim 1 foregoing, means for variably positioning the steering lever back and forth along the frame, and means for correspondingly varying the operative length of the extensor link.

3. In the construction defined in claim 1 foregoing, movement-transmitting connections between the two steering wheel spindles for turning both spindles simultaneously and equally.

4. In combination with a vehicle frame, steering wheel spindles pivoted to the frame for their steering movement; two separate operating links pivoted to the spindles respectively for turning them in steering; a plate for each spindle engaged therewith at both pivotal connections mentioned, and thereby fixed with respect to the wheel spindles respectively, and a link connecting the two plates at points therein offset in the same direction from the line of said two pivotal connections of the respective spindles.

5. In the construction defined in claim 4 foregoing, the plate mentioned being riveted fast to the spindles at the pivots of the operating links thereto.

6. In the construction defined in claim 1, means for varying the point of pivotal connection of the extensor link with the operating lever toward and from the fulcrum of said lever.

7. In the construction defined in claim 1 foregoing, means for varying the point of connection of the extensor link with the radius lever toward and from the pivot of the lever on said frame.

8. In the construction defined in claim 1 foregoing, means for independently varying the points of longitudinal connection of the extensor links with the operating levers and the radius levers, respectively, toward and from the fulcrums of the respective levers.

9. In a structure for the purpose indicated, a rigid front axle member constituting a transverse tie bar comprising two transversely extending axle plates rigidly spaced apart one above the other; steering wheel spindles pivotally mounted between the plates at their opposite ends and extending inward from their pivotal connections between the plates; operating connections to the spindles respectively engaged therewith at said inwardly extending parts and sectoral wear plates mounted on the lower of the two axle plates, on which wear plates the inner ends of the spindles respectively bear.

In testimony whereof I have hereunto set my hand at Chicago, Illinois, this twelfth day of July, 1920.

CONRAD DAHL.